United States Patent
Wang et al.

(10) Patent No.: US 10,291,101 B2
(45) Date of Patent: May 14, 2019

(54) PERMANENT-MAGNET DIRECT-DRIVE WIND POWER GENERATOR, SYSTEM AND STATOR THEREOF

(71) Applicant: XINJIANG GOLDWIND SCIENCE & TECHNOLOGY CO., LTD., Urumqi, Xinjiang (CN)

(72) Inventors: Dong Wang, Xinjiang (CN); Shengjun Ma, Xinjiang (CN); Yanhui Li, Xinjiang (CN); Chengqian Liu, Xinjiang (CN); Xiang Zhao, Xinjiang (CN)

(73) Assignee: XINJIANG GOLDWIND SCIENCE & TECHNOLOGY CO., LTD., Urumqi, Xinjiang (CN)

( * ) Notice: Subject to any disclaimer, the term of this patent is extended or adjusted under 35 U.S.C. 154(b) by 0 days.

(21) Appl. No.: 15/544,983

(22) PCT Filed: Nov. 17, 2015

(86) PCT No.: PCT/CN2015/094821
§ 371 (c)(1),
(2) Date: Jul. 20, 2017

(87) PCT Pub. No.: WO2016/119511
PCT Pub. Date: Aug. 4, 2016

(65) Prior Publication Data
US 2018/0019642 A1    Jan. 18, 2018

(30) Foreign Application Priority Data

Jan. 27, 2015 (CN) .......................... 2015 1 0042591

(51) Int. Cl.
*H02K 1/20* (2006.01)
*H02K 9/04* (2006.01)
(Continued)

(52) U.S. Cl.
CPC ................. *H02K 9/04* (2013.01); *F03D 9/25* (2016.05); *F03D 80/60* (2016.05); *H02K 1/187* (2013.01);
(Continued)

(58) Field of Classification Search
CPC ................................. H02K 1/20; H02K 5/20
(Continued)

(56) References Cited

U.S. PATENT DOCUMENTS 1,241,503 A * 10/1917 Field .................... H02K 1/20
310/65
1,244,509 A * 10/1917 Lamme .................... H02K 1/20
310/64
(Continued)

FOREIGN PATENT DOCUMENTS

CN    1242640 A    1/2000
CN    1290420 A    4/2001
(Continued)

OTHER PUBLICATIONS

International Search Report dated Feb. 4, 2016; PCT/CN2015/094821.
(Continued)

*Primary Examiner* — Burton S Mullins
(74) *Attorney, Agent, or Firm* — Ladas & Parry LLP (57) ABSTRACT

A permanent-magnet direct-drive wind power generator, a system and a stator thereof are provided. The stator includes a stator support, a stator iron core arranged around an outer peripheral wall of the stator support and a blade side tooth pressing plate arranged on an axial end face at a blade side of the stator iron core. At least one first air hole is provided in the outer peripheral wall of the stator support, and at least one second air hole is provided in the blade side tooth pressing plate, and further includes at least one air flow
(Continued)

passage via which the first air hole and the second air hole are in communication with each other, and the air flow passage passes through the interior of the stator iron core. The stator can introduce air flow inside the stator support to an axial end face of the stator iron core.

22 Claims, 6 Drawing Sheets

(51) Int. Cl.
*H02K 5/10* (2006.01)
*F03D 9/25* (2016.01)
*H02K 7/18* (2006.01)
*H02K 1/18* (2006.01)
*H02K 15/12* (2006.01)
*F03D 80/60* (2016.01)
*H02K 5/20* (2006.01)
*H02K 9/02* (2006.01)

(52) U.S. Cl.
CPC ............... *H02K 1/20* (2013.01); *H02K 5/10* (2013.01); *H02K 7/1838* (2013.01); *H02K 15/125* (2013.01); *F05B 2220/7068* (2013.01); *H02K 5/20* (2013.01); *H02K 9/02* (2013.01); *Y02E 10/725* (2013.01)

(58) Field of Classification Search
USPC .............................................. 310/52, 58–59
See application file for complete search history.

(56) References Cited

U.S. PATENT DOCUMENTS

| | | | |
|---|---|---|---|
| 2,129,535 A * | 9/1938 | Pohl | .................. H02K 1/20 310/63 |
| 5,000,769 A | 3/1991 | Raguideau et al. | |
| 6,097,128 A | 8/2000 | Ko | |
| 6,710,479 B2 * | 3/2004 | Yoshida | .................. H02K 1/20 310/52 |
| 7,462,963 B2 | 12/2008 | Ishihara et al. | |
| 7,944,076 B2 * | 5/2011 | Stiesdal | ................. H02K 1/278 290/55 |
| 8,866,351 B2 * | 10/2014 | Le Besnerais | ........... H02K 9/22 310/54 |
| 2006/0226717 A1 | 10/2006 | Nagayama et al. | |
| 2012/0112570 A1 * | 5/2012 | Le Besnerais | ......... H02K 1/185 310/54 |
| 2014/0054897 A1 | 2/2014 | Casazza et al. | |
| 2016/0118862 A1 * | 4/2016 | Maki-Ontto | ............ H02K 9/02 310/59 |

FOREIGN PATENT DOCUMENTS

| | | | | |
|---|---|---|---|---|
| CN | 1848620 A | 10/2006 | | |
| CN | 101789644 A | 7/2010 | | |
| CN | 202586575 U | 12/2012 | | |
| CN | 202798279 U | 3/2013 | | |
| CN | 103184982 A | 7/2013 | | |
| CN | 104600886 A | 5/2015 | | |
| CN | 204334142 A | 5/2015 | | |
| EP | 1586769 A2 | 10/2005 | | |
| EP | 2234246 A1 | 9/2010 | | |
| EP | 2615299 A1 * | 7/2013 | ............... | H02K 1/20 |
| JP | 62225141 A | 10/1987 | | |
| JP | 2000-134845 A | 5/2000 | | |
| WO | WO 0121956 A1 * | 3/2001 | ............... | H02K 5/12 |

OTHER PUBLICATIONS

The First Chinese Office Action dated Jul. 29, 2016; Appln. No. 201510042591.3.
Notification on Grant of Patent Right for Invention dated Oct. 8, 2016; Appln. No. 201510042591.3.
The Extended European Search Report dated May 30, 2018; Appln. No. 15879709.2.

* cited by examiner

PERMANENT-MAGNET DIRECT-DRIVE WIND POWER GENERATOR, SYSTEM AND STATOR THEREOF

CROSS-REFERENCE TO RELATED APPLICATIONS

This application is the national phase of International Application No. PCT/CN2015/094821, titled "PERMANENT-MAGNET DIRECT-DRIVE WIND POWER GENERATOR, SYSTEM AND STATOR THEREOF", filed on Nov. 17, 2015 which claims the benefit of priority to Chinese patent application No. 201510042591.3 titled "PERMANENT-MAGNET DIRECT-DRIVE WIND POWER GENERATOR, SYSTEM AND STATOR THEREOF", filed with the Chinese State Intellectual Property Office on Jan. 27, 2015, the entire disclosures of which applications are incorporated herein by reference.

FIELD

This application relates to the field of wind power technology, and particularly to a permanent magnet direct-drive wind power generator, a permanent magnet direct-drive wind power generator system and a stator thereof.

BACKGROUND

An open-type permanent magnet direct-drive outer-rotor wind power generator in the conventional technology is cooled by natural air. An open-type structure is conducive to natural ventilation heat transfer, and facilitates the use of a permanent magnet material for magnetic poles to prevent magnetism reduction in case of an impermissible degree of temperature rising. However, the power generator is usually exposed to extremely severe environmental conditions (exposed to wind, frost, rain, snow, dust, salt fog, etc.).

Air-cooled generator insulation having a tendency to being moistened is decided by its operation status and structure. Since the generator insulation can only employ a solid insulation medium which is embedded in iron core slots, and cannot be immersed in an insulating oil like a transformer does, and also cannot be sealed in an airtight metal shell filled with SF6 gas like a full-closed gas insulated substation (GIS) does, but can only be exposed to the air. During normal operation, heat generated by an iron core and a winding of the generator needs to be brought away by flowing air. When heat generated by the generator and heat dissipated from the generator reach equilibrium, temperatures of the iron core and the winding of the generator are maintained within a certain numerical range. When the generator operates normally, the interior of the natural air cooled outer-rotor permanent magnet direct-drive generator also takes air from outdoors as a cooling medium. The temperatures of the iron core and the winding may be higher than the temperature of the air as the cooling medium. After the generator stops, the temperatures of the iron core and the winding drop gradually, and due to the effect of thermal expansion and contraction of the air inside the clearances and air gaps, a lot of air enters the generator to reach a pressure balance. In such a case, the insulation absorbs moisture in the air to be moistened, and if it is in a thunderstorm season, the air humidity may be larger after the rain, and the insulation of the generator will be moistened even more seriously. After the insulation of the generator is moistened, the leakage current is scores of times or even hundreds of times of the normal value, and the insulation resistance is a few tenths of the normal value. According to data analysis, if the generator insulation is seriously moistened, it cannot operate if not performed with a drying treatment. Generator insulation being moistened seriously is considered from the perspective of insulation test data. In fact, at the early stage of the insulation being moistened, only the surface of the insulation adsorbs moisture, and the interior of the insulation has not been moistened, the moisture on the surface of the insulation is tiny and is much easier to dry compared with the case of the insulation being immersed by water.

When the air has a large humidity, the reduction of the insulation resistance, resulted from the insulation of the generator being moistened, takes a short time, e.g. one day or even several hours. Thus it is required that the rain is restricted to enter the generator in rainy days or the wet air inside the generator is taken away timely after the rain.

For the open-type nacelle outer-rotor wind power generator, if a contact seal is employed, the interior of the generator cannot be directly cooled by relatively dry air flow for a long time in the dry time when it is not rainy or snowy.

At present, thermal power generation units, hydroelectric power generation units and nuclear power units operating in the power grid are usually arranged in a fixed plant. Generally, the plant may not suffer intrusion of rain and snow. Even if the hydroelectric power generation units are flooded, and the cooling medium (water) used by the above generator units is leaked, maintenance of the operating condition of the power generation units operating on the ground is far more convenient than that of onshore or offshore wind power generators operating in the wind plant. In the aspect of generator cooling, while convenience and superior performance of air-cooling in the natural environment can be taken advantage, the insulation level of the insulation system of the generator should be addressed and put to the test. The permanent magnet direct-drive outer-rotor wind power generator is exposed to wind, sand, rain, snow, sun exposure or freezing environment after downtime all the year round, which is drastically different from the environment where the ground turbo generators, gas turbine generators, hydraulic turbine generators are located, especially some repair works cost too much, and the crane use of the high-altitude operation (60 meters to 120 meters) requires a high payment. So the work which is easy to carry out on the ground becomes even impossible for the wind power generators. In another aspect, the operation in wind power generators is also dependent on windy weather. A wind turbine drives the generator rotor to rotate, and only after the generator stator senses the potential, a three-phase short circuit operation can be implemented at an exit of the stator, and the stator is dried by heat generated by the short-circuit current to improve the insulation level. Meanwhile, it also needs to implement pitch alternation based on the magnitude of the current wind speed to indirectly control the rotation speed of the generator, and further control the short circuit current and control the winding to generate heat to dry the moisture, and all of these conditions are dependent on the weather. Moreover, the duration of the wind affects the moisture drying effect, and the direct-drive outer rotor permanent magnet wind power generator has a large mass and requires an extremely large amount of the generated heat, and both the time for heat conduction after heat generation and the mass transfer drying time in moisture drying require several hours, thus the duration and intermittence of the wind both affect the moisture drying effect.

The inventors have found in the practical operation that the conventional technology has the following drawbacks.

(1) The permanent magnet direct-drive outer rotor wind power generator employs natural air to cool a stator iron core support and an outer wall of the rotor, and a certain amount of air in the natural environment intrudes into the cavity of the generator via the clearances between the stator and rotor of the wind power generator, and then flows to another end via the air gap in the axial direction to be gathered together, and light air after being gathered is forced out from a rear end sealed portion and is discharged into atmosphere. It is a gas (vapor)-liquid-solid multiphase fluid (including air, water vapor, rain, snow, salt fog, dust, floc, etc.) that flows through the internal clearances of the generator, which can cause deterioration of insulation performance, result in degradation of electrical properties and mechanical properties as well as reduction of residual pressure level and service life of the insulation of the generator, and eventually result in damage of insulation.

(2) The above description is involved in operations of ground power generation units. High-altitude operations with 60 to 120 meters, including the realization of various functions, especially the maintenance work carried out in the nacelle, usually cannot be implemented by human and material resources and even becomes impossible. Sealing, drying measures and maintenance (repair, replacement) of wind power generators are far more difficult than those of thermal power generators and hydroelectric power generators operating on the ground. Some of the good methods used in the ground power generation units are inconvenient to carry out and even difficult to apply to the wind power generation units operating in high altitude.

(3) The above-mentioned method of drying solely by hot air is only surface drying technology, and cannot meet the drying requirement after interlayer of the laminated sheets inside the stator iron core is moistened.

(4) The use of the open-type structure cannot withstand the hazards brought by air carrying rain or snow intruding into the generator in the storm weather or snowy weather, and the cooling of the generator is at the cost of reduction of the insulation level.

(5) After the shutdown, the humid air inside the cavity of the generator and the air gap is condensed to permeate into the generator, which may cause the coated layer on the surfaces of the generator stator and the permeate magnetic pole to be moistened, and may impact their service life.

SUMMARY

An object of the present application is to provide a permanent magnet direct-drive wind power generator, a permanent magnet direct-drive wind power generator system and a stator thereof, which can introduce the air flow inside the stator support to an axial end face of the stator iron core, thereby facilitating the generator using an airflow source arranged inside to dry itself, or resisting external severe airflow (for example, rain or snow etc.) to make it difficult to enter the inside of the generator, to prolong the service life of the permanent magnet pole, and prevent reduction of the insulation level of components inside the generator, reduce the risk of moisture damage to the generator, as well as ensure the reliability of the insulation.

To achieve the above object, a stator of a permanent magnet direct-drive wind power generator is provided according to an embodiment of the present application. The stator includes a stator support, a stator iron core arranged around an outer peripheral wall of the stator support, and a blade side tooth pressing plate arranged on an axial end face at a blade side, of the stator iron core. At least one first air hole is provided in the outer peripheral wall of the stator support, and at least one second air hole is provided in the blade side tooth pressing plate. The stator further includes at least one air flow passage via which the first air hole and the second air hole are in communication with each other, and the air flow passage passes through AN interior of the stator iron core.

In addition, a stator of a permanent magnet direct-drive wind power generator is further provided according to an embodiment of the present application, which includes a stator support, a stator iron core arranged around an outer peripheral wall of the stator support, a blade side tooth pressing plate arranged on an axial end face at a blade side, of the stator iron core, and a tower side tooth pressing plate arranged on an axial end face at the tower side, of the stator iron core. At least one first air hole is provided in the outer peripheral wall of the stator support, at least one second air hole is provided in the blade side tooth pressing plate, and at least one third air hole is provided in the tower side tooth pressing plate, and the stator further includes at least one air flow passage via which the first air hole, the second air hole and the third air hole are in communication with each other, and the air flow passage passes through the interior of the stator iron core.

A permanent magnet direct-drive wind power generator is further provided according to an embodiment of the present application, which includes a rotor and the stator as described above.

In addition, a stator of a permanent magnet direct-drive wind power generator is further provided according to an embodiment of the present application, which includes a stator support, a stator iron core arranged on an outer peripheral wall of the stator support, and a tower side tooth pressing plate arranged on an axial end face at the tower side of the stator iron core. At least one first air hole is provided in the outer peripheral wall of the stator support, and at least one third air hole is provided in the tower side tooth pressing plate, and the stator further includes at least one air flow passage via which the first air hole and the third air hole are in communication with each other, and the air flow passage passes through the interior of the stator iron core.

Another permanent magnet direct-drive wind power generator is further provided according to an embodiment of the present application, which includes a rotor and the stator described above.

A permanent magnet direct-drive wind power generator system is further provided according to an embodiment of the present application, which includes the permanent magnet direct-drive wind power generator described above, and an air source system arranged inside a wind power generator unit. The air source system is connected to the first air hole.

In the permanent magnet direct-drive wind generator, the permanent magnet direct-drive wind generator system and the stator thereof according to the embodiments of the present application, the air flow inside the stator can be introduced to an axial end face of the stator iron core, thus the wind power generator can utilize an air flow source provided therein to be self-dried, cooled or resist external severe air flow (such as rain or snow, etc.) to make it difficult to enter the inside of the generator, which can prolong the service life of the permanent magnet pole, prevent decline of insulation level of components inside the generator, reduce the risk of the generator being corroded by the severe air flow (such as rain or snow, etc.) and guarantee the reliability of insulation.

| Explanation to Reference Numerals: | | | |
|---|---|---|---|
| 1 | stator support, | 2 | first air hole, |
| 3 | blade side shroud, | 4 | convergent nozzle, |
| 41 | curved segment, | 42 | inclined segment, |
| 43 | vertical segment, | 5 | second air hole, |
| 6 | blade side tooth pressing plate, | 7 | stamped sheet fixing key, |
| 8 | stator iron core, | 9 | air flow passage, |
| 91 | axial passage, | 92 | radial passage, |
| 10 | tower side tooth pressing plate, | 11 | tower side shroud, |
| 12 | air source system, | 13 | main pipe, |
| 14 | branch pipe, | 15 | rotor support, |
| 16 | rotor sealing ring, | 17 | winding, |
| 18 | magnetic pole, | 19 | rotor end cover, |
| 20 | end cover sealing ring, | 21 | third air hole, |
| 22 | tower side sealing member. | | |

DETAILED DESCRIPTION

Embodiments of the present application are described in detail hereinafter with reference to the drawings.

The technical principle of the embodiments of the present application is to utilize air flow passages inside a stator iron core of a permanent magnet direct-drive wind power generator to introduce air source inside the unit to an axial end face of the stator iron core, so as to use the air flow to generate a micro-positive pressure environment in an internal space formed after a stator and a rotor of the wind power generator are combined, to use the air flow with the micro-positive pressure to resist intrusion of external severe airflow (air, liquid, solid multiphase flow, including air, water vapor, rain, snow, salt spray, dust, floc, etc.). The micro-positive pressure according to the embodiments of the present application refers to that the pressure of the internal airflow or environment is greater than that of the external environment, and the micro-positive pressure can be set at a magnitude to prevent the air flow outside from entering the inside of the generator. The above-mentioned severe air flow mainly refers to the rain-water gas-liquid two-phase flow or wind-snow gas-solid two-phase flow, of course, in extreme cases, there also exists gas-liquid-solid multiphase flow, including, for example, air, water vapor, rain, snow, salt spray, dust, floc etc. These severe air flows are mainly found in harsh weather conditions such as rain or snow. Therefore, the devices according to the embodiments of the present application are designed to mainly resist these severe air flows, and in the case of normal dry weather, drying and cooling of the wind power generator can be carried out by dry air flow entering the wind power generator without using the devices according to the embodiments of the present application.

First Embodiment

Figure 1:
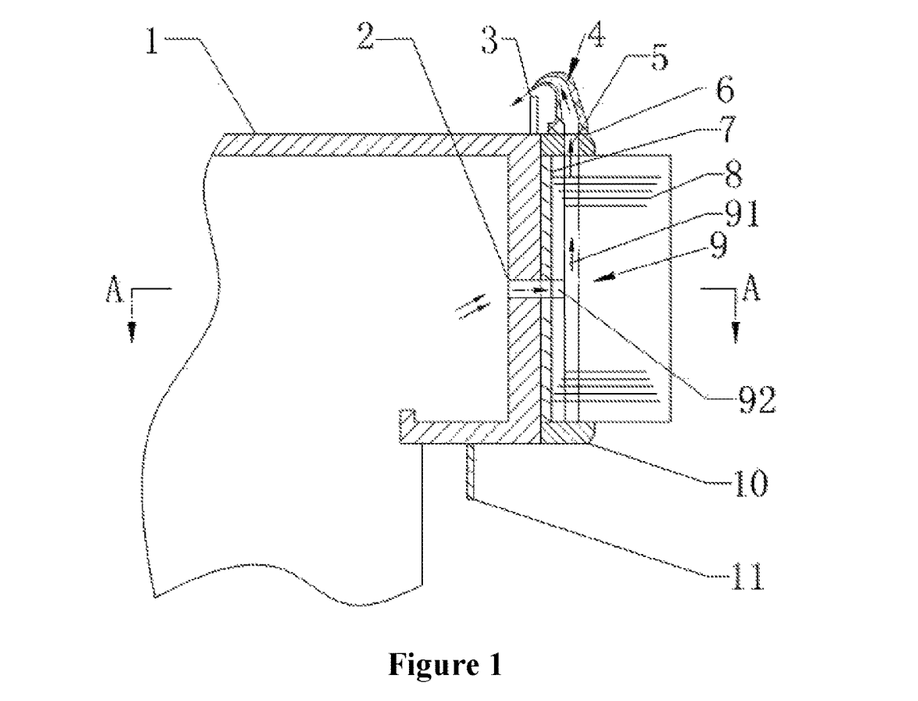
FIG. 1 is a schematic view of a stator structure of a permanent magnet direct-drive wind power generator according to a first embodiment of the present application.

As shown in FIG. 1, it is a schematic view of a stator structure of a permanent magnet direct-drive wind power generator according to a first embodiment of the present application. For convenience of description, an upper side in FIG. 1 can be defined as a blade side (during operation of the wind power generator, the blade side generally faces a windward side), and a lower side is defined as a tower side (during operation of the wind power generator, the tower side generally faces a leeward side), a horizontal direction is defined as a radial direction (a radial direction taking the entire wind power generator as center), and a vertical direction is defined as an axial direction (a direction along the rotating shaft of the wind power generator). In addition, an outer peripheral wall of a stator support refers to a side wall which is in contact with or adjacent to the stator iron core or a stamped sheet fixing key configured to fix the stator iron core, i.e., an outermost portion of the stator support.

The stator of the permanent magnet direct-drive wind generator according to this embodiment includes a stator support 1, a stator iron core 8 arranged around an outer peripheral wall of the stator support 1, and a blade side tooth pressing plate 6 provided on an axial end face at the blade side, of the stator iron core 8. The stator support is cylinder shaped, so that at least one first air hole 2 may be provided in the outer peripheral wall of the stator support 1, and at least one second air hole 5 may be provided in the blade side tooth pressing plate 6. The stator may also include at least one air flow passage 9 via which the first air hole 2 and the second air hole 5 are in communication with each other, and the air flow passage 9 may pass through the interior of the stator iron core 8.

The first air hole 2 and the second air hole 5 may be circular and may also be triangular or elliptical. In addition, the air holes may be air guiding holes of other shapes, and the like, in a word, as long as they are capable of guiding the air flow to pass through. Preferably, the first air hole 2 and the second air hole 5 are circular air holes, and a circular air hole can reduce the flow resistance along the path of the air flow.

With the stator structure, the air flow inside the stator can be introduced to an end face of the blade side tooth pressing plate 6 of the stator iron core, so that on the blade side of the wind power generator, the wind power generator can utilize an air flow source provided therein to dry and cool itself or resist external severe air flow (such as rain or snow, etc.) to make the severe air flow difficult to enter the inside of the generator, thus can prolong the service life of the permanent magnet pole, prevent decline of insulation level of a component inside the generator, reduce the risk of the generator corroded by the severe air flow (such as rain or snow, etc.) and guarantee the reliability of insulation.

Further, on the basis of the stator structure described above, an annular convergent nozzle 4 may be provided on the blade side tooth pressing plate 6, so as to control the air flow introduced from the inside of the stator for drying the wind power generator or resisting the outside air flow.

Optional embodiments of the air flow passage and the convergent nozzle involved in the stator structure described above, the air source system provided inside the wind power generator unit, and the flowing path of air flow are described in detail hereinafter.

(1) Air Flow Passage Inside the Stator Iron Core

Figure 2:
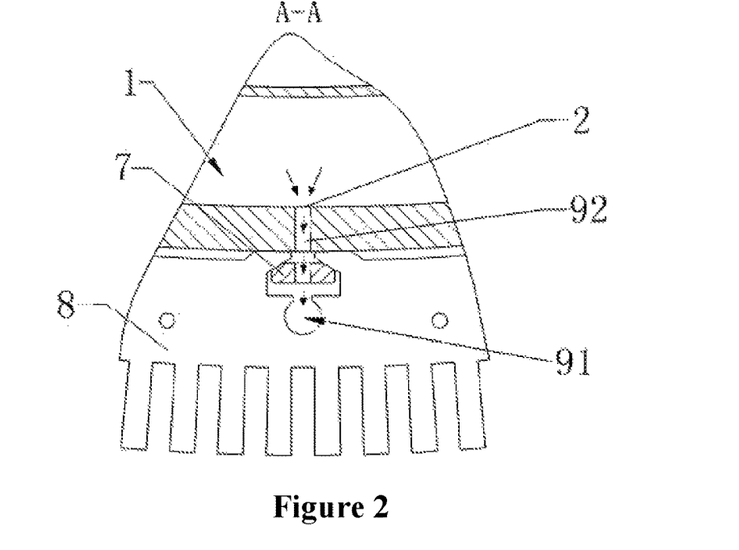
FIG. 2 is a schematic sectional view taken along the line A-A in FIG. 1.

The air flow passage 9 inside the stator iron core 8 is configured to introduce the air flow from an air source 12 inside the stator into the at least one second air hole 5 provided in the blade side tooth pressing plate 6. As shown in FIG. 2, which is a schematic view showing the structure of the air flow passage taken along the A-A section in FIG. 1, a stamped sheet fixing key 7 is fixed to the outer peripheral wall of the stator support 1, and the stator iron core 8 (the stator iron core is formed by combining multiple iron core modules, and each iron core module is formed by iron core stacking sheets) has a dovetail groove, which is sleeved on the stamped sheet fixing key 7, thereby fixing the stator iron core 8 to the outer peripheral wall of the stator support 1. The first air hole 2 may be located in the outer peripheral wall, in contact with the stamped sheet fixing key 7, of the stator support 1, and the air flow passage 9 may pass through an air hole of the stamped sheet fixing key 7 to be in communication with the first air hole 2.

Figure 6:
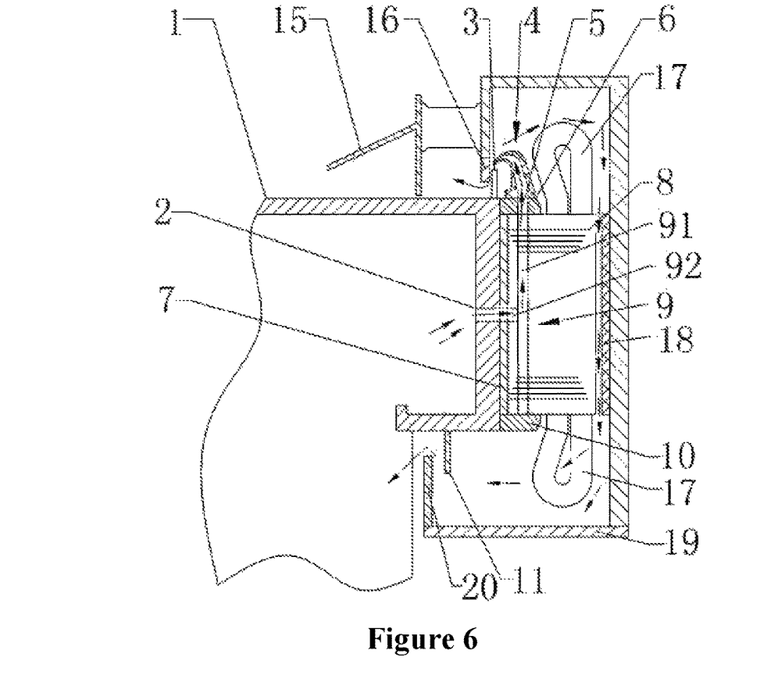
FIG. 6 is a schematic view showing the structure of a coupled portion of the stator and the rotor of the generator according to the first embodiment of the present application.

As shown in FIG. 6, the air flow passage 9 may include a radial air flow passage 92 and an axial flow passage 91. The radial air flow passage 92 may pass through the stamped sheet fixing key 7 and the inside of the stator iron core 8. The radial air flow passage 92 has one end connected to the first air hole 2 and another end connected to the axial air flow passage 91. The axial air flow passage 91 may axially pass through the inside of the stator iron core 8 to be in communication with the second air hole 5. The radial air flow passage 92 and the axial air flow passage 91 may be directly connected, or may be bent freely and then connected, as long as the radial air flow passage 92 and the axial air flow passage 91 are connected to each other.

Figure 3:
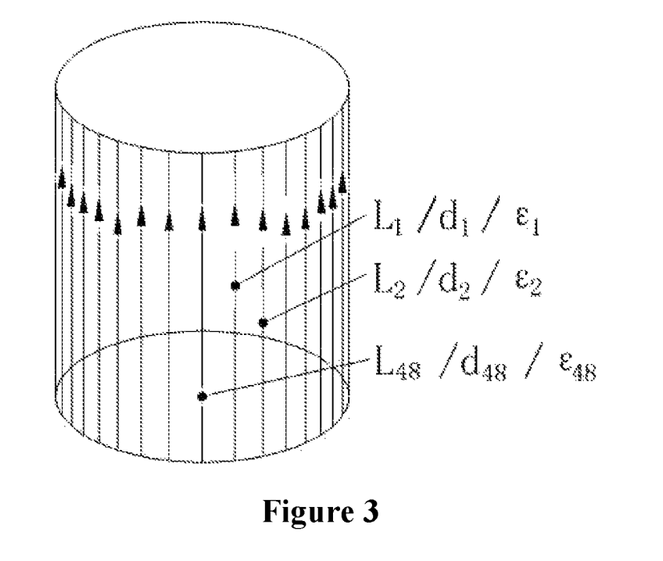
FIG. 3 is a schematic view of airflow paths inside a stator iron core of the permanent magnet direct-drive wind power generator according to the first embodiment of the present application.

Furthermore, multiple first air holes 2, second air holes 5 and air flow passages 9 may be provided and are equal in number, all of which are uniformly arranged along the circumference. The multiple first air holes 2, second air holes 5 and air flow passages 9 are in communication with each other respectively to form multiple independent air flow paths from the inner wall of the stator support 1 to the blade side tooth pressing plate 6. Preferably, below the blade side pressing plate 6 inside the stator iron core 8, the radial air flow passage 92 is turned by 90 degrees inside the stator iron core 8 to enter the axial air flow passage 91, which is in parallel with the axial direction of the generator stator. As shown in FIG. 3, which is a schematic view showing the air flow path inside the stator iron core of the permanent magnet direct-drive wind power generator according to the first embodiment of the present application, there is a one-to-one correspondence between the radial air flow passages and the axial air flow passages, only the axial air flow passages are illustrated in the figure. A plurality of air flow passages are provided according to the embodiments of the present application, preferably, as shown in FIG. 3, a total number of 48 air flow passages are provided, and preferably, each of lengths ($L_1, L_2 \ldots L_{48}$), inner diameters ($d_1, d_2 \ldots d_{48}$), and absolute roughness ($\varepsilon_1, \varepsilon_2 \ldots \varepsilon_{48}$) of the 48 air flow passages are respectively the same and the circumferential intervals are also uniform.

(2) Convergent Nozzle

Figure 4:
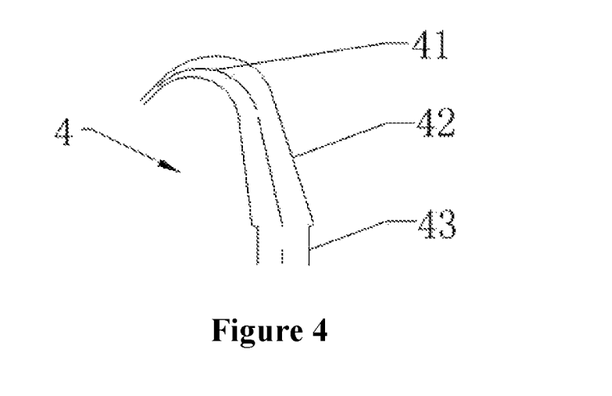
FIG. 4 is a schematic view showing the structure of a convergent nozzle provided in a permanent magnet direct-drive wind power generator according to the first embodiment of the present application.

An outlet of the convergent nozzle 4 may directly faces a gap between the stator and the rotor. The convergent nozzle 4 can accelerate the air flow and then spray it, to form a micro-positive pressure air flow at the gap between the stator and the rotor to actively resist the intrusion of "gas-liquid two-phase flow" or "gas-solid two-phase flow" of rain or snow in rainy and snowy weather time. Specifically, as shown in FIG. 4, which is a schematic view showing the structure of a convergent nozzle of the permanent magnet direct-drive wind power generator according to the first embodiment of the present application, and an annular convergent nozzle 4 (i.e., the convergent nozzle as a whole is arranged in the circumferential direction of the stator) may be arranged on the blade side tooth pressing plate 6, and the second air hole 5 is in communication with an annular inlet of the convergent nozzle 4 to introduce the gas in the air flow passage 9 inside the stator iron core 8 into the convergent nozzle 4.

In addition, on the windward side of the wind power generator (also referred to as the blade side, i.e., the upper side in FIG. 6), the stator may include a blade side shroud 3, and the rotor may include a rotor sealing ring 16. After the stator and the rotor are assembled, the annular outlet of the convergent nozzle 4 may directly face an annular gap defined by the blade side shroud 3 and the rotor sealing ring 16, thus blocking the annular gap formed between the blade side shroud 3 and the rotor sealing ring 16. Optionally, since the blade side shroud 3 is in an annular shape, the convergent nozzle 4 can be manufactured into an integrated annular nozzle which is closely circumferentially engaged with the blade side shroud 3 at the position of the at least one second air hole 5, so that the convergent nozzle 4 is seamlessly connected and further the gas flowing out of the second air holes 5 is allowed to be fully converged, and the pressure of the air flow is allowed to be uniform, thereby forming an equal pressure at the outlets of the convergent nozzles 4.

In the process of designing the convergent nozzle, the Bernoulli's equation (energy equation) of the actual fluid total flow in fluid mechanics is used to analyze the variations of pressure and flow rate of the rainwater gas-liquid two phase fluid or the wind-snow gas-solid two phase fluid (abbreviated as the external severe air flow), the variations are generated before and after the external severe air flow passing through the generator windward annular gap when the windward air flow carrying rainwater (or snow) passes through the annular gap between the stator blade side shroud 3 and the rotor sealing ring 16 (or the shroud) after impacting the wind power generator and being restricted, thereby obtaining the pressure and flow rate of the external severe air flow after entering the annular gap. Then, the equilibrium state of the fluid dynamics is utilized to calculate the pressure and flow rate of the air flow at the outlet of airtight jetting element, i.e., the annular convergent nozzle.

Generally, the pressure and flow rate of the air flow at the outlet of the annular convergent nozzle 4 only need to be slightly higher than the pressure and flow rate of the above-mentioned external severe air flow flowing into the annular gap. More preferably, the pressure and flow rate of the air flow at the outlet of the annular convergent nozzle 4 is about 3% to 5% higher than the pressure and flow rate of the external severe air flow. After the pressure and flow rate of the air flow at the outlet of the annular convergent nozzle 4 are determined, since the area of the outlet of the annular convergent nozzle 4 is constant, the flow rate of the air flow required at the outlet of the convergent nozzle 4 can be obtained. Based on the principle of flowing continuity of the fluid, the flow rate of the air flow at the outlet of the air compressor for supplying air source should be equal to the flow rate of the air flow required at the outlet of the convergent nozzle 4, thereby determining the flow rate of the air flow at the outlet of the air compressor.

In addition, according to the principle of pressure balance, the pressure of the air flow at the outlet of the air compressor for supplying the air source should be equivalent to the sum of, the pressure required by the air flow at the outlet of the annular convergent nozzle 4 and the total pressure drop of various segments from the air source to the outlet of the nozzle. The pressure drop includes pressure drop due to the resistance along the path and local resistance. As described above, the pressure at the outlet of the convergent nozzle 4 is required to be slightly higher than the pressure at which the external severe air flow entering the annular gap in order to be able to resist the external severe air flow, and after the pressure at the outlet of the convergent nozzle 4 is determined, and the total pressure drop of various links from the air source to the nozzle outlet (this can be obtained by theoretical calculation or measurement based on the structures of the air flow transmission passage and the convergent nozzle) is determined, thus the pressure of the air flow at the outlet air flow of the air compressor can be determined.

Accordingly, through the above theoretical calculations and practical measurements, the pressure and the flow rate of the air flow at the outlet of the air compressor can be determined.

Further, the cross-section of the convergent nozzle 4 may be in a sickle shape, which may include a vertical segment 43, an inclined segment 42 and a bending segment 41 communicated in the listed sequence. The vertical segment 43 is in communication with the second air hole 5, and has a constant radial width greater than or equal to a radial width of the second air hole 5. The inclined segment 42 is inclined towards the center of the stator as a whole. The bending segment 41 has a circular arc shape as a whole, and the end thereof forms the outlet of the convergent nozzle 4. The radial width of the convergent nozzle 4 is gradually decreased from the inclined segment 42 to the end of the bending segment 41. The airflow flowing through the convergent nozzle 4 can convert the pressure energy of the air flow into the kinetic energy of the air flow.

The convergent nozzle 4 generates a high velocity air flow by virtue of the sufficient pressure provided by an air supply (e.g., an air compressor), and the flow velocity and flow rate at the outlet are controllable to adapt to the change of the velocity of the air flow in the wind direction at the blade side. That is, the pressure of the air pressure seal can be automatically adjusted according to requirements, to achieve "self-adaptive" regulation, thereby reducing the power consumption of the air compressor as the air supply and saving energy.

In this embodiment, by introducing the air flow of the internal air supply into the convergent nozzle, the air flow can be accelerated by the convergent nozzle and discharged at the outlet of the convergent nozzle. Since the outlet of the convergent nozzle directly faces the annular gap between the stator and the rotor, a micro-positive pressure barrier is formed between the inside environment and the outside environment of the generator, thus can actively resist the intrusion of "gas-liquid two-phase flow" or "gas-solid two-phase flow" in the rainy and snowy weather time by means of the large amount of dry air accumulated inside the generator which is expelled out by the micro-positive pressure, thereby eliminating the humid air flow outside the generator, to allow the protective coating of the winding surface and the permanent magnet pole surface to achieve the drying requirements, thereby reducing the risk of the generator eroded by moisture generated from rain or melted snow, and improving the reliability of insulation.

(3) Air Source System within the Wind Power Generator Unit

The air source of the air source system 12 within the wind power generator system 12 (e.g., the air source system 12 may be provided amid the stator support or inside the nacelle space) may be drawn from an air pressure generation device in the nacelle. The air source system 12 can resist the intrusion of the wind and rain "gas-liquid two-phase flow" and the snow and air "gas-solid two-phase flow" in the rainy and snowy weather time. The air source system 12 operates in a time period when the inside of the generator is required to be dried, so that the energy consumption of the air source is reduced and also the stator insulation and the protective layer of the rotor magnet pole of the power generator are sufficiently dried. The air flow passage 9 provided in the stator is connected to the air source system 12 via the first air hole 2, to introduce the air source inside the wind power generator unit into the air flow passage 9. The air source system 12 may include an air source generation device for generating an air flow with a predetermined pressure and an air source processing device capable of purifying and drying the air flow.

The air source generation device may be an air compressor. The air compressor (or gas compressor) is an air pressure generation device, and is a machine for increasing the pressure of air or conveying air, and is a converting device for converting the mechanical energy supplied by an prime mover into air pressure energy. During operation of the air compressor, the air in a compressor cylinder is rapidly compressed, and the process of the gas being rapidly compressed is an exothermic process that will inevitably cause the temperature of the compressor cylinder to increase, and thus it is generally required to perform cooling. In an air compressor with multi-stage compression, exhaust temperature at the last stage may reach 140-170 Celsius degrees, and at such a high temperature, a certain amount of gaseous oil and water vapor is generally mixed in the compressed air, and a cooler is required to be provided to cool the compressed air, to primarily separate the oil and moisture in the compressed air, to prevent the oil and moisture from entering the flow passage of the stator iron core of the wind power generator along with the compressed air. Therefore, the air source processing device may also include an air filter, a cooler, an oil-water separator and a dryer. The air filter is used to filter the air before entering the air compressor cylinder (i.e., to filter the dust and other impurities contained in the air inside the nacelle) to prevent dust, solid impurities and the like in the air from entering the air compressor and thus prevent causing friction and wear between relative moving parts in the air compressor cylinder.

In addition, the oil-water separator (gas-liquid separator) is configured to further separate the oil and moisture contained in the compressed air to allow the compressed air to be preliminarily purified, thus eliminating contamination and corrosion of the oil and moisture to the flow passage inside the iron core of the stator support of the generator and the inside of the generator.

In addition, the compressed air, after passing through the cooler and oil-water separator, still contains a certain amount of moisture, the content of which depends on the temperature, pressure and relative humidity of the air. What is needed in the generator is dry air, therefore, an air drying device, i.e., a dryer is required to be arranged.

Figure 5:
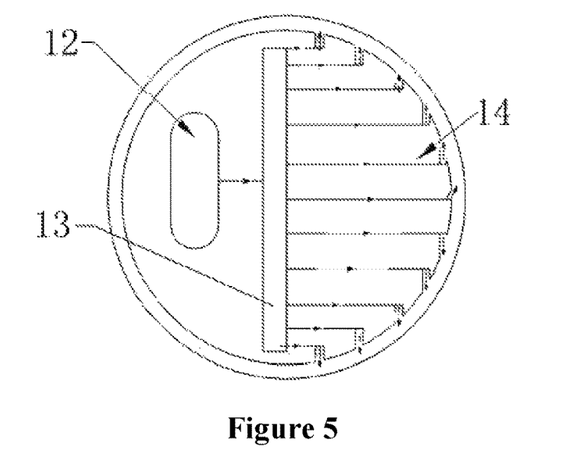
FIG. 5 is an air flow acquisition path inside the stator of the permanent magnet direct-drive wind power generator according to the first embodiment of the present application.

Further, as shown in FIG. 5, which shows an air flow acquiring path inside the stator of the permanent magnet direct-drive wind generator according to the first embodiment of the present application. The air source system 12 may be connected to the first air hole 2 via a main pipe 13 and branch pipes 14. The branch pipes 14 with the same number as the first air hole 2, can be led out from the main pipe 13, and the branch pipes 14 are connected to the first air holes 2 respectively. The maim pipe 13 is preferably circular or may be segmented annular segments, thereby reducing the resistance along the path caused to the flowing of the air flow.

(4) Flow Path of Air Flow

As shown in FIG. 6, which is a schematic view showing the structure of a coupled portion of the stator and rotor of the generator according to the first embodiment of the present application. The small arrows shown in the figure represent the flow path of the air flow. Specifically, the air flow in a nacelle, after being filtered, dried and compressed by the air source system 12, is conveyed to the first air hole 2 in the stator support 1, and the air flow passes through the stamped sheet fixing key 7 via the first air hole 2 to enter a radial air flow passage 92 of the stator iron core 8. The air flow is shifted to the axial air flow passage 91 along the radial air flow passage 92, and then passes through the blade side tooth pressing plate 6 from the axial air flow passage 91 to enter the convergent nozzle 4, and is sprayed out via the outlet of the convergent nozzle 4 after being accelerated by the convergent nozzle 4 to be blown towards the annular gap between the blade side shroud 3 and the rotor sealing ring 16, thereby blocking the annular rotation gap, and preventing the intrusion of the rain snow gas-solid two-phase flow or the rain water gas-liquid two-phase flow.

Specifically, in the operating process of the wind power generator, the blade side generally directly faces the windward direction, and the flow coming from the windward direction may rebound and sputter when impacting the generator stator support, and then impacts the rotor sealing ring to be reflected and accumulated, to cause a recovery rising of the air flow pressure (compared with the flow when coming), the airflow may intrude the annular air gap between the blade side shroud 3 and the rotor sealing ring 16. The air flow sprayed from the convergent nozzle 4 is just used for blocking the intrusion of the above air flow. After the air flow sprayed from the convergent nozzle 4 blocks the external intruded air flow, part of the air flow may be sprayed out from the annular air gap between the blade side shroud 3 and the rotor sealing ring 16 (it may also not be sprayed out which is decided by the pressure of the air flow, as long as the blocking effect can be achieved), and another part or all of the air flow may impact the rotor sealing ring 16, and the rebounded air flow after the impact enters the air gap between the stator and the rotor, to be gathered at the nacelle side at the end of the stator (i.e., between the tower side tooth pressing plate 10 and the rotor end cover 19) along the axial direction, and is finally discharged into the atmosphere environment via the annular gap between the end cover sealing ring 20 and the tower side shroud 11, and the part of air flow rebounded inside the generator may also dry the winding 17 and the magnet pole 18. An example of the structure of the stator of the permanent magnet direct-drive wind generator according to this embodiment has been described above. On this basis, a permanent magnet direct-drive wind power generator is further provided according to the first embodiment, which includes a rotor and the stator according to this embodiment. In addition, a permanent magnet direct-drive wind power generator system is further provided according to this first embodiment, which includes the wind power generator as described above and an air source system 12 provided inside the wind power generator unit, and the air source system 12 may be connected to the first air hole 2. As an optional embodiment, the air source system 12 and the components associated with the air source system 12 have also been described hereinbefore and thus are not described again.

Second Embodiment

Figure 7:
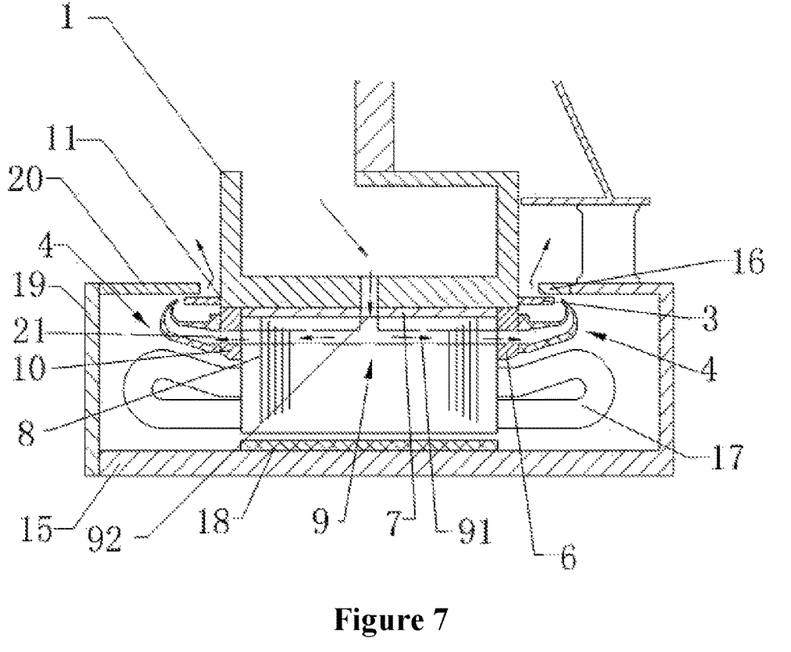
FIG. 7 is a schematic view showing the structure of a coupled portion of a stator and a rotor of a permanent magnet direct-drive wind power generator according to a second embodiment of the present application.
Figure 8:
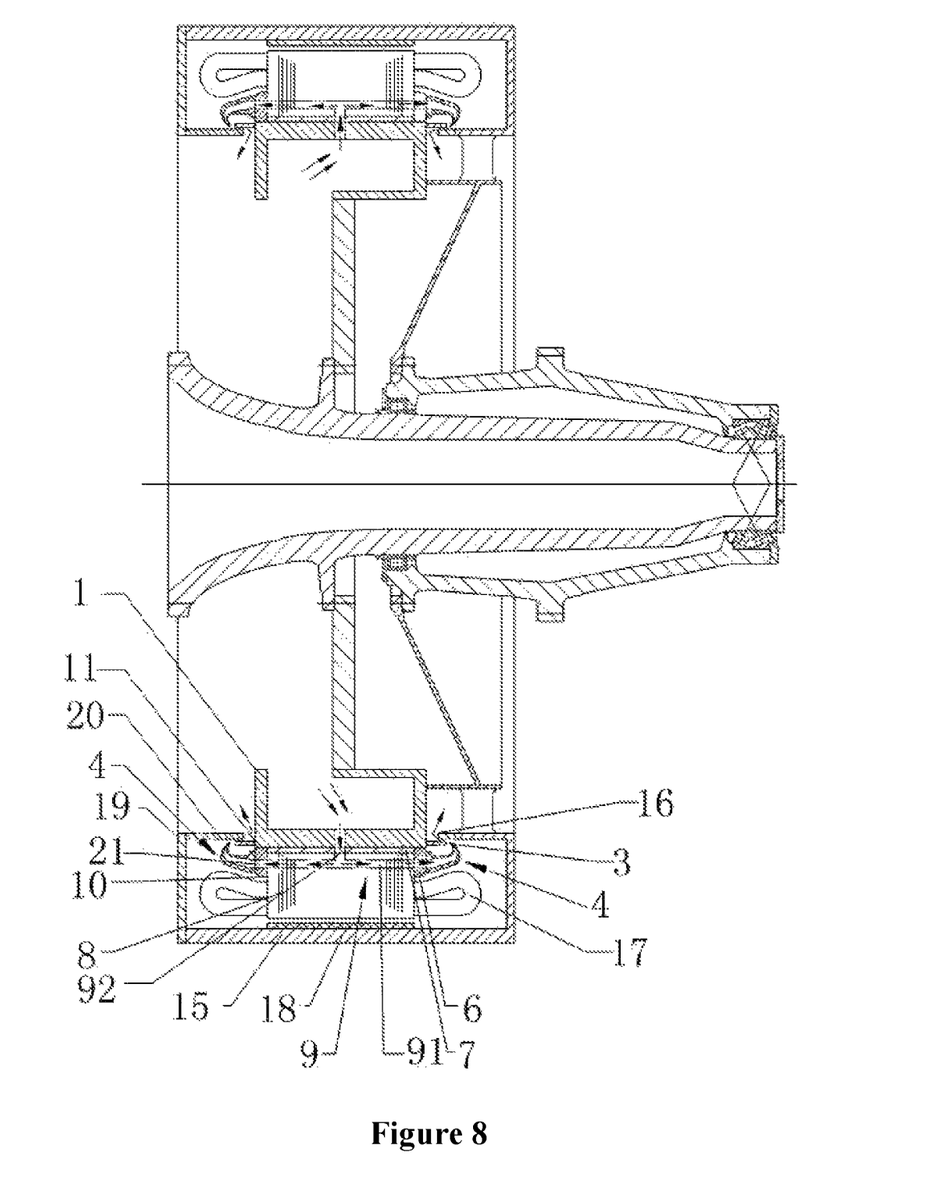
FIG. 8 is a schematic view showing the overall structure of the permanent magnet direct-drive wind power generator according to the second embodiment of the present application.

The specific structures of the stator and the permanent magnet direct-drive wind power generator according to this embodiment are as shown in FIGS. 7 and 8, FIG. 7 is a schematic view showing the structure of a coupled portion of a rotor and a stator of the permanent magnet direct-drive wind generator according to the second embodiment of the present application, and FIG. 8 is a schematic view showing the overall structure of the permanent magnet direct-drive wind generator according to the second embodiment of the present application. For convenience of description, a right side of the figure can be defined as a blade side, a left side is defined as a tower side, the vertical direction is defined as a radial direction (a radial direction taking the entire wind power generator as center), and the horizontal direction is defined as an axial direction (a direction along the rotating shaft of the wind power generator). The smaller arrows shown in the figure represent the flow path of the air flow. Hereinafter, the difference of this embodiment from the first embodiment is particularly stressed, and the part of structures which are not mentioned herein may refer to the description of the first embodiment.

The stator according to this embodiment includes a stator support 1, a stator iron core 8 arranged around an outer peripheral wall of the stator support 1, a blade side tooth pressing plate 6 provided on an axial end face at the blade side, of the stator iron core 8, and a tower side tooth pressing plate 10 arranged on an axial end face at the tower side of the stator iron core 8. At least one first air hole 2 is provided in the outer peripheral wall of the stator support 1, at least one second air hole 5 is provided in the blade side tooth pressing plate 6, and at least one third air hole 21 is provided in the blade side tooth pressing plate 10. The stator also includes at least one air flow passage 9 via which the first air hole 2, the second air hole 5 and the third air hole 21 are in communication with each other, and the air flow passage 9 passes through the interior of the stator iron core.

The third air hole 21 is similar to the first air hole 2 and the second air hole 5, and may be circular and may also be triangular or elliptical. In addition, the third air hole may be an air guiding hole of other shapes, etc., in short, as long as it is capable of guiding the air flow to pass through. Preferably, the third air hole 21 is a circular air hole, and a circular air hole can reduce the flow resistance along the path of the air flow.

With the stator structure, the air flow inside the stator can be respectively introduced to end faces of the blade side tooth pressing plate 6 and tower side tooth pressing plate 10 for the stator iron core, so that on both the blade side and the tower side of the wind power generator, the wind power generator can utilize an air flow source provided therein to be self-dried, cooled or resist external severe air flow to make it difficult to enter the inside of the generator, thus can extend the service life of the permanent magnet pole, prevent "decline of insulation level" of the internal means inside the generator, reduce the risk of the generator being corroded by the severe air flow (such as rain or snow etc.) and guarantee the reliability of insulation.

Further, on the basis of the stator structure described above, an annular convergent nozzle 4 may be provided on each of the blade side tooth pressing plate 6 and the tower side tooth pressing plate 10, so as to control the air flow introduced from the inside of the stator for drying and cooling the wind power generator or for resisting the external severe air flow.

Optional embodiments of the air flow passage and the convergent nozzle in the above stator structure, the air source system provided inside the wind power generator unit, and the flowing path of air flow inside the wind power generator unit are described in detail hereinafter.

(1) Air Flow Passage Inside the Stator Iron Core

The air flow passage 9 inside the stator iron core 8 is configured to introduce the air source inside the stator into the at least one second air hole 5 provided in the blade side tooth pressing plate 6 and the at least one third air hole 21 provided in the tower side tooth pressing plate 10. Reference may also be made to FIG. 2, a stamped sheet fixing key 7 is fixed to the outer peripheral wall of the stator support 1, and the stator iron core 8 has a dovetail groove arranged in the stamped sheet fixing key 7, thereby fixing the stator iron core 8 to the outer peripheral wall of the stator support 1. The first air hole 2 may be located in the outer peripheral wall, in contact with the stamped sheet fixing key 7, of the stator support 1, the stamped sheet fixing key 7 may be provided with an air hole, and the air flow passage 9 may extend through the air hole of the stamped sheet fixing key 7 to be in communication with the first air hole 2.

As shown in FIG. 7, similar to the first embodiment, the air flow passage 9 may include a radial air flow passage 92 and an axial air flow passage 91. The radial air flow passage 92 may pass through the stamped sheet fixing key 7 and the inside of the stator iron core 8. The radial air flow passage 92 has one end connected to the first air hole 2 and another end connected to the axial air flow passage 91. Unlike the first embodiment, in this embodiment, the axial air flow passage 91 may axially extend through the inside of the stator iron core 8 to be in communication with the second air hole 5 and the third air hole 21.

Furthermore, multiple first air holes 2, second air holes 5, third air hole 21 and air flow passage 9 may be provided and they are equal in number, and are uniformly arranged along the circumference. The multiple first air holes 2, second air holes 5, third air holes 21 and air flow passages 9 are in communication with each other respectively to form multiple independent air flow paths 9 from the inner wall of the stator support 1 to the blade side tooth pressing plate 6 and the tower side tooth pressing plate 10 respectively.

(2) Convergent Nozzle

The convergent nozzle 4 having the same structure as that of the first embodiment may also be provided in this embodiment, just, in the first embodiment, the convergent nozzle 4 is provided at one side of the generator, while in this embodiment, the convergent nozzles 4 are provided at two sides of the generator respectively. Specifically, in this embodiment, the convergent nozzles 4 are provided on the blade side tooth pressing plate 6 and the tower side tooth pressing plate 10 respectively, and the second air hole 5 and the third air hole 21 are respectively in communication with annular inlets of the convergent nozzles at corresponding sides, namely, the second air hole 5 in the blade side tooth pressing plate 6 is in communication with the inlet of the blade side convergent nozzle 4, and the third air hole 21 in the tower side tooth pressing plate 10 is in communication with the annular inlet of the tower side convergent nozzle 4, thereby introducing the gas in the air flow passage 9 inside the stator iron core 8 into the convergent nozzles 4.

As shown in FIG. 7, on the windward side of the wind power generator (may also be referred to as the blade side, i.e., the right side in FIG. 7), the stator may include a blade side shroud 3, and the rotor may include a rotor sealing ring 16. After the stator and the rotor are assembled, the outlet of the convergent nozzle 4 provided on the blade side tooth pressing plate 6 may directly face a gap defined by the blade side shroud 3 and the rotor sealing ring 16, for blocking the annular gap formed between the blade side shroud 3 and the rotor sealing ring 16. The blade side shroud 3 and the rotor sealing ring 16 are both in an annular shape. Correspondingly, on a leeward side of the wind power generator (may also be referred to as the tower side, i.e., the left side in FIG. 7), the stator may further include a tower side shroud 11, and the rotor may include a rotor sealing ring 16 and an end cover sealing ring 20. After the stator and the rotor are assembled, the outlet of the convergent nozzle 4 provided on the tower side tooth pressing plate 10 faces the gap defined by the tower side shroud 11 and the end cover sealing ring 20, for blocking the annular gap formed between the tower side shroud 11 and the end cover sealing ring 20. Optionally, since each of the blade side shroud 3 and the tower side tooth pressing plate 10 is in an annular shape, the convergent nozzle 4 can be manufactured into an integrated annular nozzle which is closely engaged with the blade side shroud 3 at the at least one second air hole 5, and the tower side tooth pressing plate 10 at the at least one third air hole 21 respectively, so that the convergent nozzle 4 is seamlessly connected to the second air hole 5 to allow the gas flowing out of the second air holes 5 to be fully converged and the pressure of the air flow to be uniform, thereby forming an equal pressure at the outlets of the convergent nozzles 4.

Similar to the first embodiment, as shown in FIG. 4, the radial profile of the convergent nozzle 4 may be in a sickle shape and may include a vertical segment 43, an inclined segment 42 and a bending segment 41 communicated in the listed sequence. The vertical segments 43 of the convergent nozzles 4 arranged on the blade side tooth pressing plate 6 and the tower side tooth pressing plate 10 are in communication with the second air hole 5 and the third air hole 21, respectively, namely, the vertical segment 43 of the convergent nozzle 4 at the blade side is in communication with the second air hole 5, and the vertical segment 43 of the convergent nozzle 4 at the tower side is in communication with the third air hole 21. The vertical segments 43 have constant radial widths which are greater than or equal to the radial width of each of the second air hole 5 and the third air hole 21 respectively. The inclined segment 42 as a whole is inclined towards the center of the stator. The bending segment 41 as a whole has a circular arc shape, and the end thereof forms the outlet of the convergent nozzle. The radial width of the convergent nozzle 4 is gradually decreased from the inclined segment 42 to the end of the bending segment 41.

(3) Air Source System within the Wind Power Generator Unit

The structure and relevant components of the air source system 12 are the same as those according to the first embodiment.

(4) Flow Path of Air Flow

As shown in FIGS. 7 and 8, the small arrows in the figure represent the flow path of the air flow. The air flow in the nacelle, after being filtered, dried and compressed by the air source system 12, is conveyed to the first air hole 2 in the stator support 1, and the air flow passes through the stamped sheet fixing key 7 from the first air hole 2 to enter a radial air flow passage 92 of the stator iron core 8, and the air flow is shifted into the axial air flow passage 91 along the radial air flow passage 92, and then passes through the blade side tooth pressing plate 6 and the tower side tooth pressing plate 10 from the axial air flow passage 91, to enter the convergent nozzles 4 at the two sides, and is sprayed out from the outlets of the convergent nozzles 4 after being accelerated by the convergent nozzles 4, to be blown towards the annular gap between the blade side shroud 3 and the rotor sealing ring 16 and the annular gap between the tower side shroud plate 11 and the end cover sealing ring 20, thereby blocking the annular gaps between the stator and the rotor from the two sides of the wind power generator, and preventing the intrusion of the rain snow gas-solid two-phase flow or the rain water gas-liquid two-phase flow.

The air flow path formed in the above first embodiment is for blocking external severe air flow intruding from the annular air gap between the blade side shroud 3 and the rotor sealing ring 16 (the air flow intruded from the blade side), however, the air flow path formed by the structure of this embodiment can further block the external severe air flow intruding from the annular gap between the end cover sealing ring 20 and the tower side shroud 11 (the air flow intruded from the tower side). Namely, the annular convergent nozzles 4 are provided on both the blade side and the tower side according to this embodiment, and thus may block the external severe air flow from the two sides.

Generally, in the operating process of the wind power generator, the blade side generally directly faces the windward direction, and the external air flow on the windward side of the wind power generator is strong, and the flow coming from the windward direction may rebound and sputter when impacting the generator stator support, and then impacts the rotor sealing ring to be reflected and accumulated, to cause recovery rising of the air flow pressure (compared with the flow when coming), these airflow may intrude the annular air gap between the blade side shroud 3 and the rotor sealing ring 16.

After the air flow sprayed from the convergent nozzle 4 blocks the external intruded air flow from the blade side, part of the air flow may be sprayed out from the annular air gap between the blade side shroud 3 and the rotor sealing ring 16 (it may also not be sprayed out, which is decided by the pressure of the air flow as long as the blocking effect can be achieved), and another part or all of the air flow may impact the rotor sealing ring 16, and the rebounded air flow after the impact enters the air gap between the stator and the rotor, and finally is discharged into the atmosphere environment via the annular gap between the end cover sealing ring 20 and the tower side shroud 11, and the part of air flow rebounded inside the generator may also dry the winding 17 and the magnet pole 18.

In this case, since the external air flow on the tower side is weaker compared with the external air flow on the blade side, the air flow sprayed out from the convergent nozzle 4 provided on the tower side can be directly sprayed out from the annular gap between the tower side shroud 11 and the end cover sealing ring 20.

In another aspect, considering the complexity of the environment of the wind field and the ever-changing wind direction, and when the wind power generator is in a stopped state, the wind direction that the blade side and the tower side face may also change, in many cases, it may occur that the external air flow intruding from the tower side is strong, it is necessary to employ the convergent nozzle 4 provided on the tower side to block the external severe airflow in this case.

In this case, the external air flow on the tower side is stronger and the external air flow on the blade side is weak. After the air flow sprayed from the convergent nozzle 4 blocks the external intruded air flow from the tower side, part of the air flow may be sprayed out from the annular air gap between the tower side shroud 11 and the end cover sealing ring 20 (it may also not be sprayed out, which is decided by the pressure of the air flow, as long as the blocking effect can be achieved), and another part or all of the air flow may impact the end cover sealing ring 20, and the rebounded air flow after the impact enters the air gap between the stator and the rotor, and finally is discharged into the atmosphere environment via the annular air gap between the blade side shroud 3 and the rotor sealing ring 16, and these parts of air flow rebounded inside the generator may also dry the winding 17 and the magnet pole 18.

In this embodiment, since the convergent nozzle 4 is also provided on the tower side, the external air flow from the blade side and the tower side can both be blocked compared with the first embodiment, and thus can better ensure that the inside of the wind power generator is not subject to intrusion of external air flow.

In addition, a permanent magnet direct-drive wind power generator is further provided according to this second embodiment, which may include a rotor and the stator according to this embodiment. The specific structure is as shown in FIG. 8.

In addition, a permanent magnet direct-drive wind power generator system is further provided according to this second embodiment, which includes the wind power generator as described above and an air source system 12 provided inside a wind power generator unit, and the air source system 12 may be connected to the first air hole 2. As an optional embodiment, the air source system 12 and the components associated with the air source system 12 have also been described hereinbefore and are not described herein again.

Third Embodiment

Figure 9:
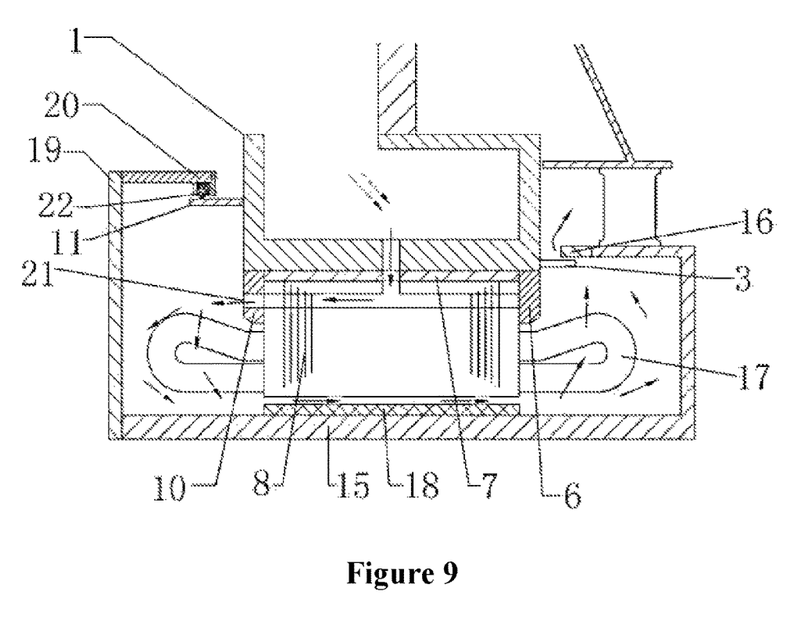
FIG. 9 is a schematic view showing the structure of a coupled portion of a stator and a rotor of a permanent magnet direct-drive wind generator according to a third embodiment of the present application.

The specific structures of the stator and the permanent magnet direct-drive wind power generator according to this embodiment are as shown in FIG. 9, which is a schematic view showing the structure of a coupled portion of a rotor and a stator of the permanent magnet direct-drive wind generator according to the third embodiment of the present application. For convenience of description, a right side of the figure can be defined as a blade side (in the operating process of the wind power generator, the blade side may generally face the windward side), a left side is defined as a tower side (in the operating process of the wind power generator, the blade side may generally face the leeward side), the vertical direction is defined as a radial direction (a radial direction taking the entire wind power generator as center), and the horizontal direction is defined as an axial direction (a direction along the rotating shaft of the wind power generator). The small arrows shown in the figure represent the flow path of the air flow. Hereinafter, the differences of this embodiment from the first embodiment and the second embodiment are particularly stressed, and the structure of the non-mentioned part may refer to the description of the first embodiment.

The stator of the permanent magnet direct-drive wind power generator according to this embodiment includes a stator support 1, a stator iron core 8 arranged around an outer peripheral wall of the stator support 1, and a tower side tooth pressing plate 10 arranged on an axial end face of the stator iron core 8 at the tower side. At least one first air hole 2 may be provided in the outer peripheral wall of the stator support 1, and at least one third air hole 21 is provided in the blade side tooth pressing plate 10. The stator may also include at least one air flow passage 9 via which the first air hole 2 and the third air hole 21 are in communication with each other, and the air flow passage 9 may pass through the interior of the stator iron core 8.

With the stator structure, the air flow inside the stator can be introduced to an end face of the tower side tooth pressing plate 10 of the stator iron core, so that on the tower side of the wind power generator, the wind power generator can utilize an air flow source provided therein to be self-dried, or resist external severe air flow to make it difficult to enter the inside of the generator, thus can prolong the service life of the permanent magnet pole, prevent "decline of insulation level" of the internal means inside the generator, reduce the risk of the generator being eroded by the severe air flow (such as rain or snow etc.) and guarantee the reliability of insulation.

In addition, unlike the first embodiment and the second embodiment, in this embodiment, the stator is not provided with the convergent nozzle.

Furthermore, a permanent magnet direct-drive wind power generator is further provided according to this embodiment, which may include a rotor and the stator according to this embodiment. The stator may include a tower side shroud 11, the rotor may include an end cover sealing ring 20, a tower side sealing member 22 may be provided between the tower side shroud 11 and the end cover sealing ring 20. The tower side sealing member 22 may be fixed to either of the tower side shroud 11 and the end cover sealing ring 20, to seal the gap between the tower side shroud 11 and the end cover sealing ring 20 in a dynamic sealing mode.

In addition, unlike the above two embodiments, in this embodiment, a micro-positive pressure environment is built up completely by the flowing of the air flow inside the wind power generator rather than by the convergent nozzle, to resist the intrusion of external air flow.

In addition, a permanent magnet direct-drive wind power generator system is further provided according to this embodiment, which may include the wind power generator as described above and an air source system 12 provided inside a wind power generator unit, and the air source system 12 may be connected to the first air hole 2. The structure and arrangement of the air source system 12 are the same as those in the first embodiment.

Optional embodiments of the air flow passage arranged inside the above stator structure, the air source system provided inside the wind power generator unit, and the flowing path of air flow inside the wind power generator unit are described in detail hereinafter.

(1) Air Flow Passage Inside the Stator Iron Core

As shown in FIG. 9, similar to the first embodiment, the air flow passage 9 may include a radial air flow passage 92 and an axial air flow passage 91. The radial air flow passage 92 may pass through the stamped sheet fixing key 7 and the inside of the stator iron core 8. The radial air flow passage 92 has one end connected to the first air hole 2 and another end connected to the axial air flow passage 91. Unlike the first embodiment, in this embodiment, the axial air flow passage 91 may axially pass through the inside of the stator iron core 8 to be in communication with the third air hole 21.

Furthermore, multiple first air holes 2, the third air holes 21 and air flow passages 9 may be provided and they are equal in number, and are uniformly arranged along the circumference. The multiple first air holes 2, third air holes 21 and air flow passages 9 are in communication with each other respectively to form multiple independent air flow passages 9 from the inner wall of the stator support 1 to the tower side tooth pressing plate 10.

(2) Air Source System within the Wind Power Generator Unit

The structure and relevant components of the air source system 12 are the same as those according to the first embodiment.

(3) Flow Path of Air Flow

In this embodiment, the micro-positive pressure environment is achieved not by the convergent nozzles, but by blocking the air flow with the tower-side sealing member 22.

As shown in FIG. 9, the small arrows shown in the figure represent the flow path of the air flow. Specifically, the air flow in the nacelle, after being filtered, dried and compressed by the air source system 12, is conveyed to the first air hole 2 in the stator support 1, and the air flow passes through the stamped sheet fixing key 7 via the first air hole 2 to enter a radial air flow passage 92 of the stator iron core 8, and the air flow is shifted into the axial air flow passage 91 along the radial air flow passage 92. After the air flow in the nacelle reaches the axial passage 91, since the blade side is closed, the air flow flows out via the third air hole 21, to flow towards the leeward end of the generator. Since the tower side sealing member 22 is provided between the tower side shroud 11 and the end cover sealing ring 20 to blocks the air flow, a majority of air flow enters the annular air gap formed between the stator support 1 and the rotor support 15. In this annular air gap, the air flow passes through the tower side winding 17 and the magnet pole 18, then reaches an end of the blade side winding, and finally is squeezed out of the annular gap between the blade side shroud 3 and the rotor sealing ring 16 to be discharged into the atmospheric environment.

Such solution has the following advantages: since the dry air flow needs to pass through the annular air gap formed between the stator support 1 and the rotor support 15, the winding 17 and magnet pole 18 on both the tower side and the blade side can be dried, also a micro-positive pressure air flow can be further formed at the windward side, to resist the external air flow to enter the inside of the generator.

The embodiments described hereinabove are only specific embodiments of the present application, and the scope of the present application is not limited thereto. Any variations or substitutions easily conceived by those skilled in the art within the technical scope disclosed in the present application should be covered in the scope of the present application. Therefore, the scope of the present application should be defined by the scope of the claims.

The invention claimed is:

1. A stator of a permanent magnet direct-drive wind power generator, comprising
   a stator support,
   a stator iron core arranged around an outer peripheral wall of the stator support, and
   a blade side tooth pressing plate arranged on an axial end face at a blade side, of the stator iron core, wherein, at least one first air hole is provided in the outer peripheral wall of the stator support, at least one second air hole is provided in the blade side tooth pressing plate; and the stator further comprises at least one air flow passage via which the first air hole and the second air hole are in communication with each other, and the air flow passage passes through an interior of the stator iron core, and wherein a stamped sheet fixing key is fixed on the outer peripheral wall of the stator support, a dovetail groove of the stator iron core is sleeved on the stamped sheet fixing key, and the air flow passage passes through the stamped sheet fixing key to be in communication with the first air hole.

2. The stator according to claim 1, wherein the air flow passage comprises a radial air flow passage and an axial air flow passage, the radial air flow passage passes through the stamped sheet fixing key and the interior of the stator iron core, the radial air flow passage has one end connected to the first air hole and another end connected to the axial air flow passage, and the axial air flow passage passes through the interior of the stator iron core along an axial direction to be in communication with the second air hole.

3. The stator according to claim 2, wherein the numbers of the first air hole, the second air hole and the air flow passage each are more than one and are the same; the more than one first air hole, second air hole and air flow passage are all circumferentially and uniformly arranged, and are in communication correspondingly to form more than one independent air flow path from the outer peripheral wall of the stator support to the blade side tooth pressing plate.

4. The stator according to claim 1, wherein an annular convergent nozzle is provided on the blade side tooth pressing plate, and the second air hole is in communication with an annular inlet of the convergent nozzle.

5. The stator according to claim 4, wherein the stator comprises a blade side shroud, a rotor matching with the stator comprises a rotor sealing ring, and after assembly and installation of the stator and rotor, an annular outlet of the convergent nozzle faces an annular gap defined by the blade side shroud and the rotor sealing ring.

6. The stator according to claim 4, wherein a section of the convergent nozzle is sickle-shaped and comprises a vertical segment, an inclined segment and a curved segment which are connected in sequence;

the vertical segments is in communication with the second air hole, and has a constant radial width greater than or equal to a radial width of the second air hole;

the inclined segment as a whole is inclined towards the center of the stator; and the curved segment as a whole is in a circular arc shape, an end of the curved segment forms an outlet of the convergent nozzle, and the radial width is gradually reduced from the inclined segment to the end of the curved segment.

7. A permanent magnet direct-drive wind power generator, comprising a rotor and the stator according to claim 1.

8. A permanent magnet direct-drive wind power generator system, comprising the permanent magnet direct-drive wind power generator according to claim 7, and an air source system arranged inside a wind power generator unit, and the air source system is connected to the first air hole.

9. The wind power generator system according to claim 8, wherein the air source system comprises an air source generation device configured to generate an air flow with a predetermined pressure, and an air source treatment device configured to purify and dry the air flow.

10. The wind power generator system according to claim 9, wherein the air source generation device is an air compressor and the air source treatment device comprises an air filter, a cooler, an oil-water separator and a dryer.

11. The wind power generator system according to claim 10, wherein the air source system is connected to the first air hole via a main pipe and branch pipes, and the branch pipes with the same number as the first air holes, are introduced from the main pipe, and the branch pipes are connected to the first air holes respectively.

12. A stator of a permanent magnet direct-drive wind power generator, comprising a stator support, a stator iron core arranged on an outer peripheral wall of the stator support, a blade side tooth pressing plate arranged on an axial end face at a blade side of the stator iron core, and a tower side tooth pressing plate arranged on an axial end face at a tower side of the stator iron core, wherein, at least one first air hole is provided in the outer peripheral wall of the stator support, at least one second air hole is provided in the blade side tooth pressing plate, and at least one third air hole is provided in the tower side tooth pressing plate, and the stator further comprises at least one air flow passage via which the first air hole, the second air hole and the third air hole are in communication with each other, and the air flow passage passes through an interior of the stator iron core, and wherein a stamped sheet fixing key is fixed on the outer peripheral wall of the stator support, and a dovetail groove of the stator iron core is arranged on the stamped sheet fixing key, and the air flow passage passes through the stamped sheet fixing key to be in communication with the first air hole.

13. The stator according to claim 12, wherein the air flow passage comprises a radial air flow passage and an axial air flow passage, the radial air flow passage passes through the stamped sheet fixing key and the interior of the stator iron core, the radial air flow passage has one end connected to the first air hole and another end connected to the axial air flow passage, and the axial air flow passage passes through the interior of the stator iron core along an axial direction to be in communication with the second air hole and the third air hole respectively.

14. The stator according to claim 13, wherein the numbers of the first air hole, the second air hole, the third air hole and the air flow passage each are more than one and the same, the more than one first air hole, second air hole, third air hole and air flow passage are all circumferentially and uniformly arranged, and are in communication correspondingly to form more than one independent air flow path from the outer peripheral wall of the stator support to the blade side tooth pressing plate and the tower side tooth pressing plate.

15. The stator according to claim 12, wherein annular convergent nozzles are provided on the blade side tooth pressing plate and the tower side tooth pressing plate respectively, and the second air hole and the third air hole are in communication with annular inlets of the convergent nozzles respectively.

16. The stator according to claim 15, wherein the stator comprises a blade side shroud and a tower side shroud, a rotor comprises a rotor sealing ring and an end cover sealing ring;

after assembly and installation of the stator and rotor, an annular outlet of the convergent nozzle arranged on the blade side tooth pressing plate faces an annular gap defined by the blade side shroud and the rotor sealing ring, and an annular outlet of the convergent nozzle arranged on the tower side tooth pressing plate faces an annular gap defined by the tower side shroud and the end cover sealing ring.

17. The stator according to claim 16, wherein a section of the convergent nozzle is sickle-shaped and comprises a vertical segment, an inclined segment and a curved segment which are connected in sequence;

the vertical segments of the convergent nozzle arranged on the blade side tooth pressing plate and the convergent nozzle arranged on the tower side tooth pressing plate are in communication with the second air hole and the third air hole, respectively, and have constant radial widths which are greater than or equal to a radial width of the second air hole and a radial width of the third air hole, respectively;

the inclined segment as a whole is inclined towards the center of the stator; and the curved segment as a whole is in a circular arc shape, an end of the curved segment forms an outlet of the convergent nozzle, and the radial width is gradually reduced from the inclined segment to the end of the curved segment.

18. A stator of a permanent magnet direct-drive wind power generator, comprising a stator support, a stator iron core arranged around an outer peripheral wall of the stator support, and a tower side tooth pressing plate arranged on an axial end face at a tower side of the stator iron core, wherein, at least one first air hole is provided in the outer peripheral wall of the stator support, and at least one third air hole is provided in the tower side tooth pressing plate, and the stator further comprises at least one air flow passage via which the first air hole and the third air hole are in communication with each other, and the air flow passage passes through the interior of the stator iron core, and wherein a stamped sheet fixing key is fixed on the outer peripheral wall of the stator support, a dovetail groove of the stator iron core is arranged on the stamped sheet fixing key, and the air flow passage passes through the stamped sheet fixing key to be in communication with the first air hole.

19. The stator according to claim 18, wherein the air flow passage comprises a radial air flow passage and an axial air flow passage, the radial air flow passage passes through the stamped sheet fixing key and the interior of the stator iron core, the radial air flow passage has one end connected to the first air hole and another end connected to the axial air flow passage, and the axial air flow passage extends axially through the interior of the stator iron core to be in communication with the third air hole.

20. The stator according to claim 19, wherein the numbers of the first air hole, the third air hole and the air flow passage each are more than one and the same; the more than one first air hole, third air hole and air flow passage are all circumferentially and uniformly arranged, and are in communication correspondingly to form more than one independent air flow path from the outer peripheral wall of the stator support to the blade side tooth pressing plate.

21. A permanent magnet direct-drive wind power generator, comprising a rotor and the stator according to claim 18.

22. The wind power generator according to claim 21, wherein the stator comprises a tower side shroud, and the rotor comprises an end cover sealing ring, a tower side sealing component is provided between the tower side shroud and the end cover sealing ring, the tower side sealing component is fixed to one of a tower side shroud plate or the end cover sealing ring, to seal an annular gap between the tower side shroud and the end cover sealing ring in a dynamic sealing mode.

* * * * *